(12) United States Patent
Hafner et al.

(10) Patent No.: US 6,863,056 B2
(45) Date of Patent: Mar. 8, 2005

(54) METHOD AND APPARATUS FOR TRIMMING AN INTERNAL COMBUSTION ENGINE

(75) Inventors: Gregory G. Hafner, Normal, IL (US); Brian G. McGee, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/659,998

(22) Filed: Sep. 11, 2003

(65) Prior Publication Data

US 2004/0045536 A1 Mar. 11, 2004

Related U.S. Application Data

(60) Continuation of application No. 10/103,441, filed on Mar. 21, 2002, now abandoned, which is a division of application No. 09/615,849, filed on Jul. 13, 2000, now Pat. No. 6,480,781.

(51) Int. Cl.⁷ .............................................. F02M 51/00
(52) U.S. Cl. ........................ 123/478; 123/480; 701/104; 73/119 A
(58) Field of Search ................................. 123/478, 479, 123/480, 486, 488, 456, 446, 447, 494; 701/102–105; 73/119 A

(56) References Cited

U.S. PATENT DOCUMENTS

| | | | | |
|---|---|---|---|---|
| 6,173,690 B1 | * | 1/2001 | Iriya et al. .................. 123/295 |
| 6,278,915 B1 | * | 8/2001 | Deguchi et al. .............. 701/22 |
| 6,295,808 B1 | * | 10/2001 | Griffin et al. ................. 60/776 |
| 6,352,056 B1 | * | 3/2002 | Ruman ................... 123/65 PE |
| 6,363,314 B1 | * | 3/2002 | Hafner et al. ............... 701/104 |
| 6,480,781 B1 | * | 11/2002 | Hafner et al. ............... 701/104 |

* cited by examiner

Primary Examiner—John T. Kwon
(74) Attorney, Agent, or Firm—Blackwell Sanders Peper Martin LLP

(57) ABSTRACT

A fuel injection control system and method for trimming an internal combustion engine during a fuel injection event based upon engine operating conditions, the control system including an electronic controller in electrical communication with the engine, the controller being operable to detect the operating mode of each injector of the engine and alter each injector operating mode as desired.

15 Claims, 5 Drawing Sheets

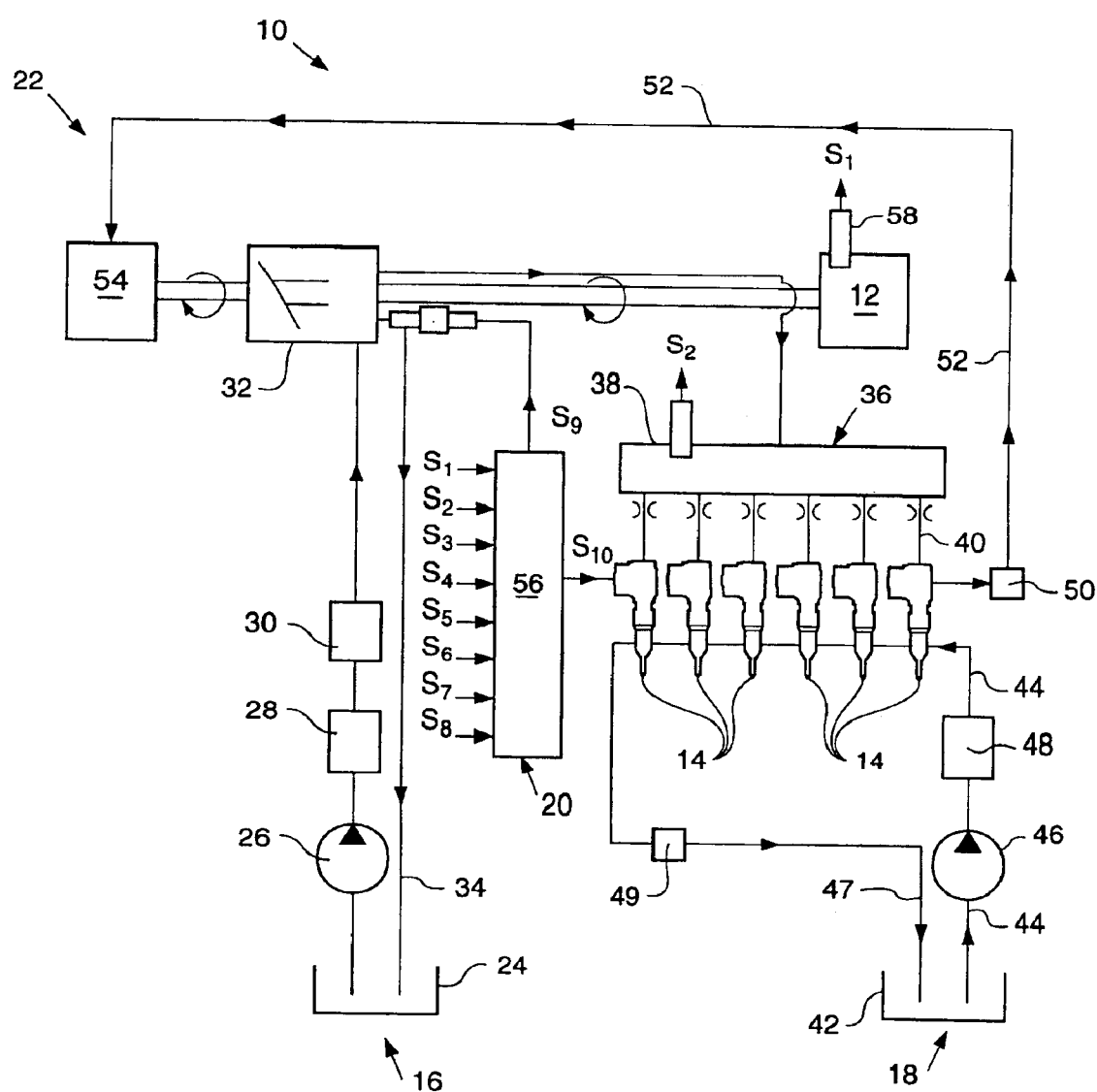

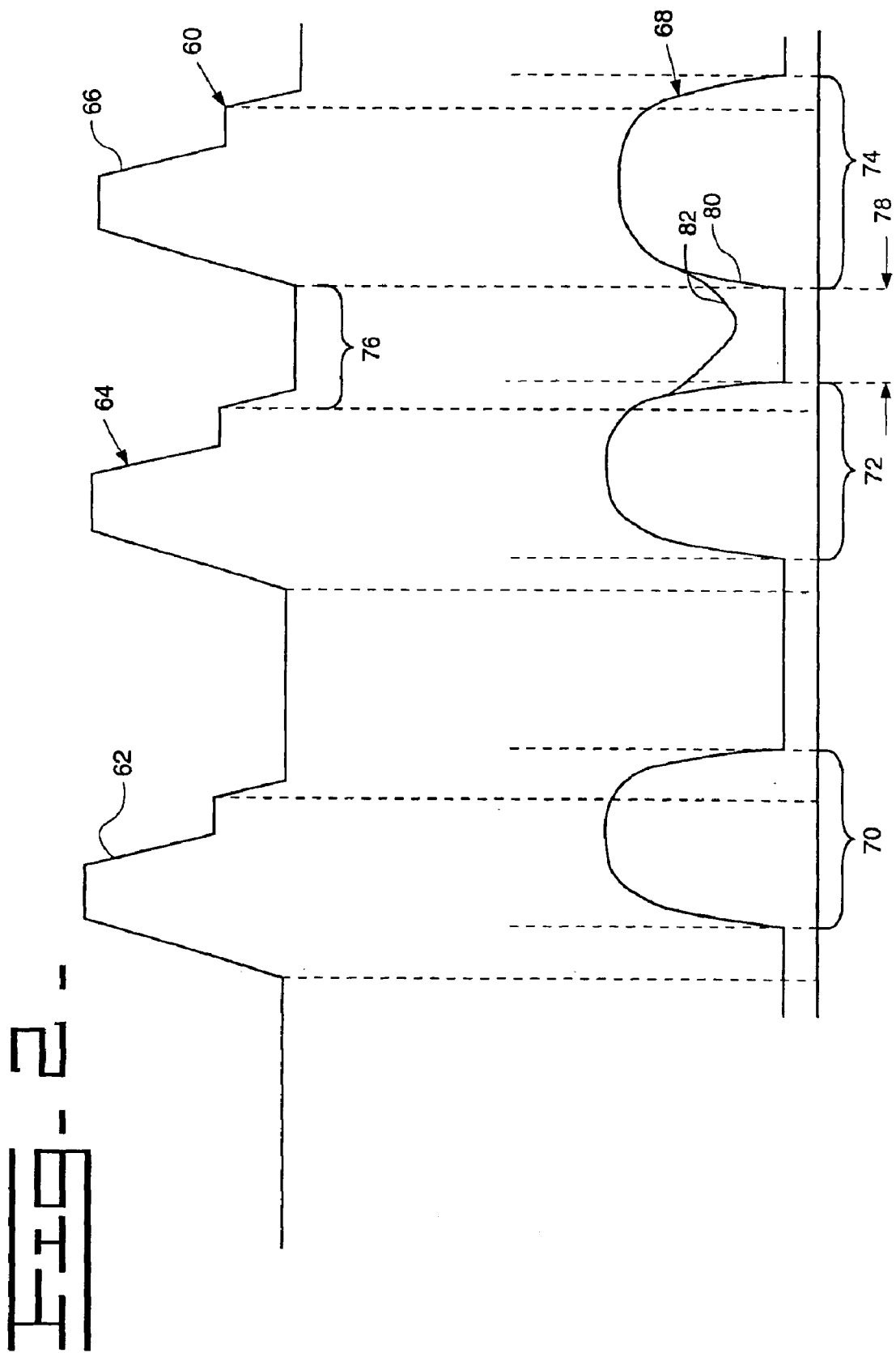

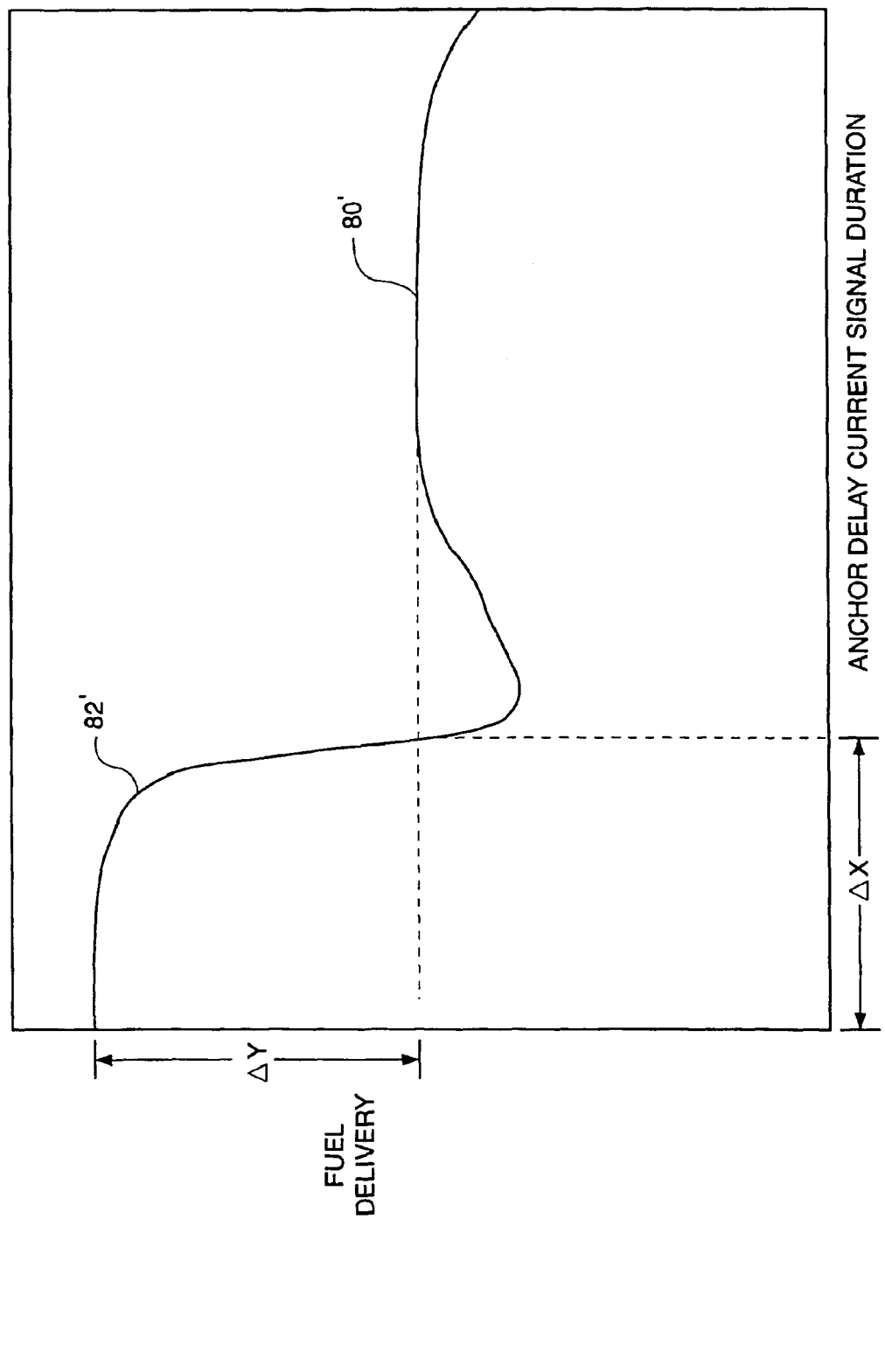

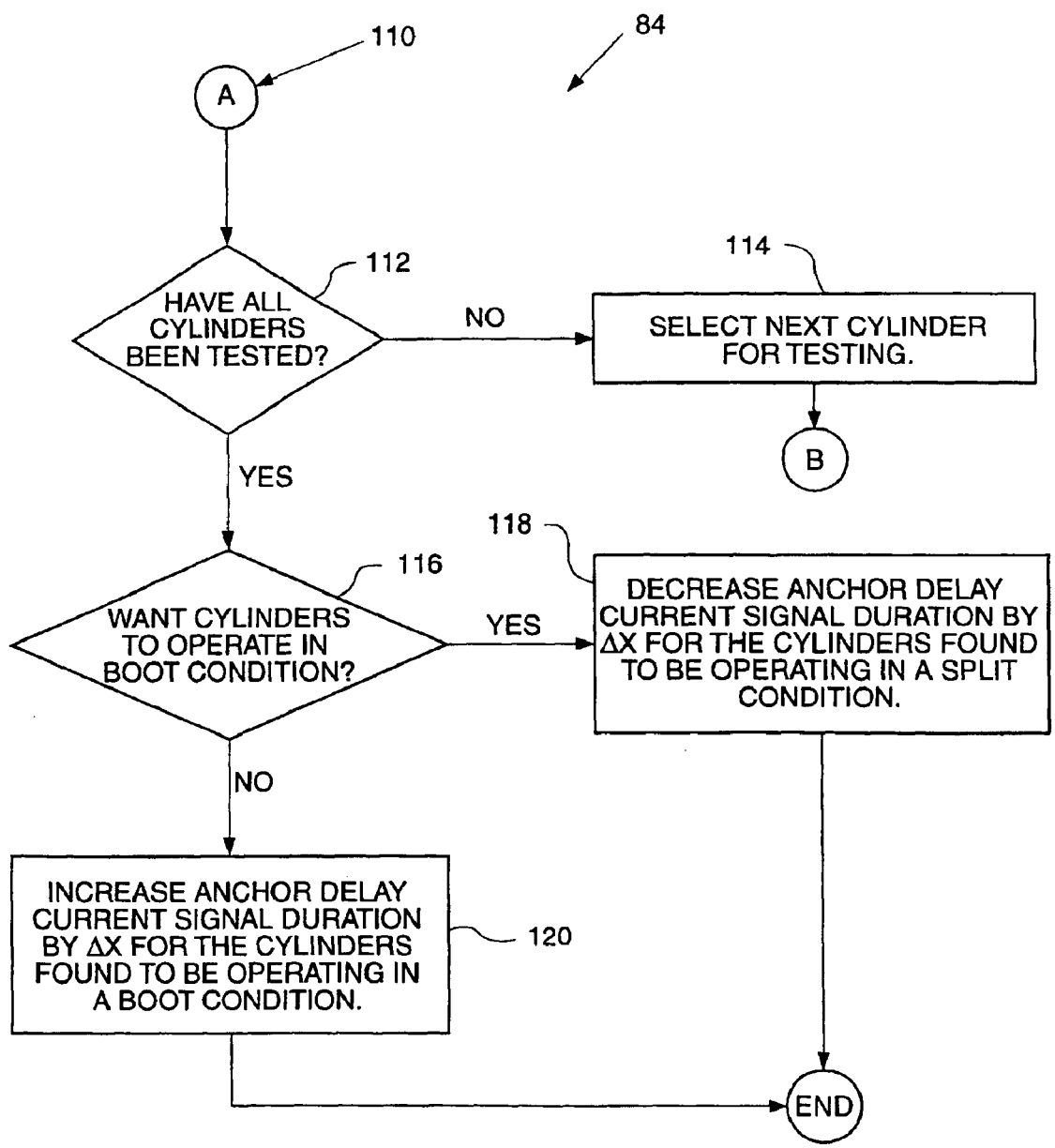
Fig_4b_

METHOD AND APPARATUS FOR TRIMMING AN INTERNAL COMBUSTION ENGINE

This application is a continuation application of U.S. patent application Ser. No. 10/103,441 filed Mar. 21, 2002, now abandoned, which is a divisional application of U.S. patent application Ser. No. 09/615,849 filed Jul. 13, 2000, now issued as U.S. Pat. No. 6,480,781.

TECHNICAL FIELD

This invention relates generally to electronically controlled fuel injection systems and, more particularly, to a method and apparatus for determining a desired duration at which to set a delay during multiple shot fuel injections for each injector device of the injection system.

BACKGROUND ART

Electronically controlled fuel injectors are well known in the art including hydraulically actuated and mechanically actuated electronically controlled fuel injectors. An electronically controlled fuel injector typically injects fuel into a specific engine cylinder as a function of an injection signal received from an electronic controller. These signals include waveforms that are indicative of a desired injection rate as well as the desired timing and quantity of fuel to be injected into the cylinders.

Emission regulations pertaining to engine exhaust emissions are increasingly becoming more restrictive throughout the world including, for example, restrictions on the emission of hydrocarbons, carbon monoxide, particulate and nitrogen oxides ($NO_x$). Tailoring the number and the parameters of the injection fuel shots during a particular injection event are ways in which to control emissions and meet such emission standards. As a result, techniques for generating split or multiple fuel injections during an injection event have been utilized to modify the burn characteristics of the combustion process in an attempt to reduce emissions and noise levels. Generating multiple injections during an injection event typically involves splitting the total fuel delivery to the cylinder during a particular injection event into two or more separate fuel injections, generally referred to as a pilot injection fuel shot, a main injection fuel shot and/or an anchor injection fuel shot. As used throughout this disclosure, an injection event is defined as the injections that occur in a cylinder during one cycle of the engine. For example, one cycle of a four cycle engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine. At different engine operating conditions, it may be necessary to use different injection strategies in order to archive both desired engine operation and emissions control.

In the past, the controllability of split or multiple injections has been somewhat restricted by mechanical and other limitations associated with the particular types of fuel injections utilized. For example, when delivering a split or multiple injection current waveform to a plurality of fuel injectors, some injectors will actually deliver the split fuel delivery to the particular cylinder whereas some injectors will deliver a boot fuel delivery. A boot type of fuel delivery generates a different quantity of fuel as compared to a split type fuel delivery since in a boot type delivery, the fuel injection flow rate never goes to zero between the respective fuel shots. Conversely, in a split fuel delivery, the fuel injection flow rate does go to zero between the respective fuel shots. As a result, more fuel is delivered in a boot type delivery as compared to a split fuel delivery. Even with more advanced electronically controlled injectors, during certain engine operating conditions it is still sometimes difficult to accurately control fuel delivery.

When dealing with split or multiple fuel injection and the general effects of a boot type fuel delivery and the fuel injection rate shaping which results therefrom, desired engine performance is not always achieved at all engine speed and engine load conditions. Based upon operating conditions, the injection timing, fuel flow rate and injected fuel volume are desirably optimized in order to achieve minimum emissions and optimum fuel consumption. This is not always achieved in a multiple injection system due to a variety of reasons including limitations on the different types of achievable injection rate waveforms and the timing of the fuel injections occurring during the injection events. As a result, problems such as injecting fuel at a rate or time other than desired within a given injection event and/or allowing fuel to be injected beyond a desired stopping point can adversely affect emission outputs and fuel economy. From an emissions standpoint, either a split or boot fuel delivery may be preferable, depending on the engine operating conditions.

In a system in which multiple injections and different injection waveforms are achievable, it is desirable to control and deliver any number of separate fuel injections to a particular cylinder so as to minimize emissions and fuel consumption based upon the operating conditions of the engine at that particular point in time. This may include splitting the fuel injection into more than two separate fuel shots during a particular injection event and/or adjusting the timing between the various multiple fuel injection shots in order to achieve the desired injector performance, that is, a split or a boot type fuel delivery, based upon the current operating conditions of the engine.

Accordingly, the present invention is directed to overcoming one or more of the problems as set forth above.

DISCLOSURE OF THE INVENTION

In one aspect of the present invention, there is disclosed an electronically controlled fuel injection system which is capable of delivering multiple fuel injections to a particular cylinder of an internal combustion engine during a single injection event. The present system includes means for variably determining whether two, three, or more separate fuel injections or fuel shots are desired during a fuel injection event at given engine operating conditions including engine speed and engine load. In this regard, in a preferred embodiment, fuel is apportioned between a first or pilot shot, a second or main shot and a third or anchor shot, each separate fuel injection shot being delivered when the cylinder piston is located within a predetermined range during a particular piston stroke. The present system also includes means for varying the timing and fuel quantity associated with the main shot, the timing and the fuel quantity associated with the anchor shot, as well as the duration of the anchor delay, based upon the operating conditions of the engine.

Under certain operating conditions, the proximity of the main and anchor shots and the resultant internal injector hydraulics and/or mechanics leads to a rate shaping effect of the third or anchor injection. As a result, although the first or pilot injection, when used, is typically a distinct injection as compared to the second, or main, and the third, or anchor, injections, a distinct anchor injection is not always apparent. The present invention enables determination as to whether a given injector is delivering a distinct third shot and, based upon considerations such as engine performance, minimization of emissions, injector durability and so forth, the present system alters the anchor shot delay, if necessary, to achieve the desired injector performance.

These and other aspects and advantages of the present invention will become apparent upon reading the detailed description in connection with the drawings and appended claims.

BRIEF DESCRIPTION OF THE DRAWINGS

For a better understanding of the present invention, references may be made to the accompanying drawings in which:

FIG. 1 is a schematic view of an electronically controlled injector fuel system used in connection with one embodiment of the present invention;

FIG. 2 is an exemplary schematic illustration of a current waveform sequentially aligned with a corresponding fuel injection rate trace;

FIG. 3 is a schematic profile illustrating how the volume of fuel injected varies according to the duration of the anchor delay;

FIG. 4b is a second segment of a logic diagram showing the operation of the present invention.

BEST MODE FOR CARRYING OUT THE INVENTION

Figure 4A:
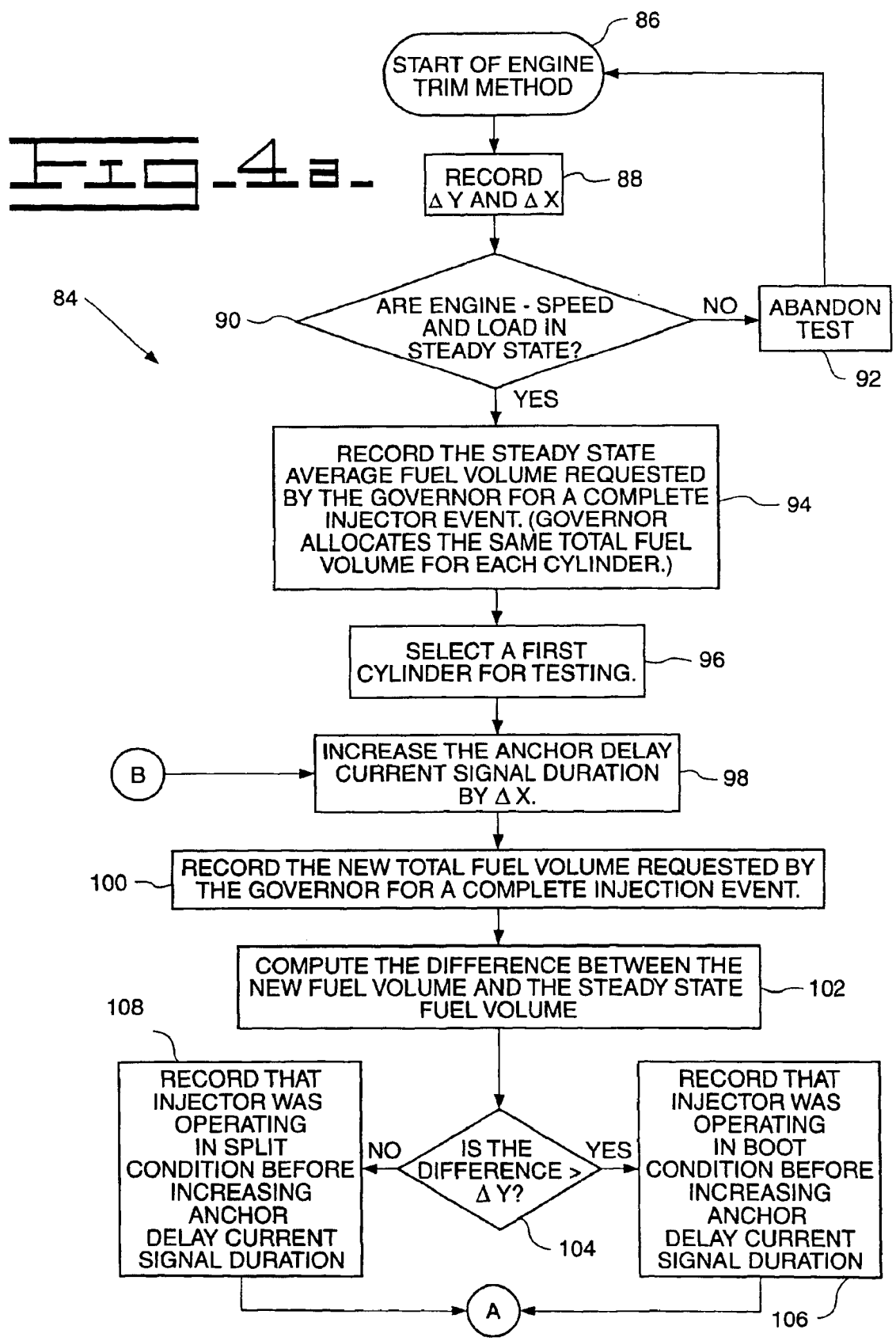
FIG. 4a is a first segment of a logic diagram showing the operation of the present invention.

Referring to FIG. 1, there is shown one embodiment of a hydraulically actuated electronically controlled fuel injection system 10 in an exemplary configuration as adapted for a direct-injection compression ignition engine 12. Fuel system 10 includes one or more electronically controlled fuel injectors 14 which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any plurality of cylinders or combustion chambers.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection, time delay between each injection, and the injection profile. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, an actuating fluid cooler 28, one or more actuating fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high-pressure actuation fluid pump 32. A rail branch passage 40 connects the actuation fluid inlet of each injector 14 to the high-pressure common rail passage 38.

The apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high-pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel.

The fuel supply means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, also referred to as a controller, the use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) current level of the injector waveform, and (10) any combination of the above parameters. Each of such parameters may be variably controllable independent of engine speed and load. ECM 56 receives a plurality of sensor input signals $S_1$–$S_8$ which correspond to known sensor inputs such as engine operating conditions including engine speed, engine temperature, pressure of the actuation fluid, cylinder piston position and so forth that may be used to determine the precise combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is input to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of fuel injectors 14, control signal $S_{10}$ is a fuel injection signal that is an ECM commanded current to the injector solenoid or other electrical actuator.

It is recognized that the type of fuel injection desired during any particular fuel injection event will typically vary depending upon various engine operating conditions. In an effort to improve emissions, it has been found that delivering multiple fuel injections to a particular cylinder during a fuel injection event at certain engine operating conditions achieves both desired engine operation as well as emissions control.

FIG. 2 shows an exemplary current wave trace or waveform 60 having a pilot current pulse 62, a main current pulse 64, and an anchor current pulse 66 sequentially aligned with a rate trace profile 68 illustrating the fuel injection flow rate. The rate trace profile 68 includes a pilot shot 70 responsive to the pilot pulse 62, a main shot 72 responsive to the main pulse 64 and an anchor shot 74 responsive to the anchor pulse 66.

An anchor delay current signal 76, separating the main and anchor pulse signals 64 and 66, produces a corresponding anchor delay 78 when the main and anchor shots 72 and 74 operate in a split condition, i.e., the fuel flow rate is significantly reduced for the duration of the anchor delay current signal as illustrated by the split profile segment 80 shown in FIG. 2. In one embodiment, for an injection signal utilizing two injections, the injections may be referred to generically as being a first injection, e.g., main injection, a second injection, e.g., an anchor injection, and an injection delay, e.g., an anchor delay.

Due to the fact that it is difficult to produce cylinder injection systems having identical operating characteristics, and because the main and anchor shots 72 and 74 occur close together, it is possible that the duration of the anchor delay current signal 76 will be insufficient to produce a split between the main and anchor shots 72 and 74, i.e., a significant reduction in the fuel flow rate is not realized. This occurrence is known as a boot condition and is illustrated by the boot profile segment 82 shown in FIG. 2.

Depending on variables such as ambient operating conditions, desired engine performance, minimized emissions and so forth, it may be advantageous, in certain scenarios, for the injectors to function in a split mode. In other situations, it may be advantageous for the injectors to function in a boot condition. Whichever mode is preferred, preferably all of the injectors function in the desired mode. To achieve the desired mode, the split/boot operating condition of each injector is detected. Thereupon, injectors found to be operating in the undesired condition are corrected to function in the desired mode.

In one embodiment, the operating mode of an injector can be determined by monitoring changes in the volume of fuel desired by the governor when the engine is in a steady state condition. FIG. 3 illustrates the difference in the volume of fuel delivered during the split mode, as shown by the split mode segment 80', as compared to the boot mode, as shown by the boot mode segment 82', for a given rail pressure and main pulse signal 64 duration. The curve profile shown in FIG. 3 is representative of accumulated statistical data acquired from the performance test history of similar injector types, with $\Delta Y$ being a predetermined value derived from the cumulative statistical average difference in fuel volume delivered between boot and split modes.

The operating mode of an injector can be altered by adjusting the duration of the anchor delay current signal. This is known as trimming the engine. A desirable magnitude of adjustment duration, known as the anchor delay current signal offset, is a predetermined value derived from the statistical maximum duration of the boot condition, as represented by $\Delta X$ in FIG. 3.

A flow chart 84, having a first segment 86 illustrated in FIG. 4a, shows the sequential process of the present invention for trimming an engine, i.e., for detecting the operating mode of a given injector and adjusting the mode as needed. As shown in box 88, the predetermined $\Delta X$ and $\Delta Y$ values are recorded into the memory of the ECM 56.

In the preferred embodiment, the engine is operating at a steady state speed. In addition the engine is also desirably operating at a steady state load. The ECM 56 then determines whether the engine speed and load are operating in a steady state, as indicated by decision box 90. The values of the various engine trim lookup maps relied upon by the ECM 56 include a corresponding fixed rail pressure and main shot duration. If the engine speed and load are not operating in a steady state, the rail pressure and main shot duration will fluctuate, making the data in the lookup maps inaccurate. Therefore, if a steady state is not detected, the engine trim test is abandoned, as indicated by box 92.

When the engine speed and load are determined to be in the steady state, the average fuel volume requested by the governor (not shown) for an injection event is established, as shown in box 94. It should be noted that this is the volume of fuel desired to be delivered equally to all cylinders undergoing an injection event, as opposed to the volume delivered to an individual cylinder.

The ECM 56 then selects a first cylinder for testing, as indicated in box 96. As shown in box 98, the anchor delay current signal duration is then increased by the anchor delay current signal offset duration $\Delta X$. Referring back to FIG. 3, it is clear that if the tested injector was operating anywhere in a boot mode, i.e., anywhere along the boot mode segment 82', under steady state conditions, an increase in the anchor delay current signal duration of $\Delta X$ will cause the injector to switch to operating in a split mode, i.e., somewhere along the split mode segment 80'. Accordingly, a notable reduction in fuel consumption will be realized. Conversely, if the tested injector was operating in a split mode in the steady state, it will continue to operate in a split mode when the anchor delay current signal duration is increased by $\Delta X$. Accordingly, any change in fuel consumption will be negligible.

As seen in box 100, the new volume of fuel requested by the governor over several complete injection events is established and averaged. The difference between the steady state volume of fuel and the new volume of fuel for one injection event is then computed, as shown in box 102. The difference may be between the steady state volume of fuel and a specific volume of fuel for a specific injection event, or the volume of fuel for the averaged fuel injection.

In decision box 104, the difference computed in box 102 is compared to the predetermined $\Delta Y$ volume. If the computed volume is greater than the $\Delta Y$ volume, the ECM 56 establishes that the injector being tested was operating in a boot mode under steady state conditions, as indicated in box 106. Conversely, if the computed volume is less than the ΔY volume, the ECM 56 records that the injector was operating in a split mode under steady state conditions, as shown in box 108.

In the preferred embodiment, the ECM 56 determines whether all cylinders have been tested, as illustrated by decision box 112 of a second segment 110 of the flow chart 84 shown in FIG. 4*b*. If untested cylinders remain, the ECM 56 selects the next cylinder for testing as indicated by box 114, and returns to box 98 of FIG. 4*a* to begin testing the selected cylinder as previously explained.

In the preferred embodiment, upon testing all cylinders, the ECM 56 determines whether it is desirable for all of the injectors to operate in a desired, or pre-selected operating mode, such as a boot mode or a split mode, as shown by decision box 116. If it is desirable to have all injectors operate in a boot mode, the ECM 56 decreases the anchor current signal duration for each injector associated with a cylinder found to be operating in a split condition by a duration of ΔX, as indicated in box 118. Conversely, if it is preferable for the injectors to operate in a split mode, the ECM 56 increases the anchor current signal duration for each injector associated with a cylinder found to be operating in a boot condition by a duration of ΔX, as indicated in box 120.

In an alternative embodiment, the anchor delay current signal 76 may be incrementally altered by a time value smaller than ΔX until a more precise value is determined for the anchor delay current signal duration that will yield a change in the injector operating mode.

In a further alternative embodiment, the ECM 56 is designed to detect the operating mode of an injector 14, and regulate it as desired, by monitoring the actual engine speed instead of, or in conjunction with the fuel requested by the governor. A change in the fuel quantity injected by an injector 14 due to switching from a boot mode to a split mode will cause a corresponding change in engine speed, which will be detected by the ECM 56 of this embodiment. In one embodiment, the change in speed may be determined by sensing the instantaneous firing speed of a cylinder. The ECM 56 will adjust the anchor delay current signal 76 as needed to cause the injector 14 to operate in the desired mode.

In one embodiment, the trimming technique disclosed may be applied to any injection signal having two injection shots. For example, an injection signal including a pilot and main injection, or a pilot and anchor injection, or a main and anchor injection.

INDUSTRIAL APPLICABILITY

Utilization of an injection method and system in accordance with the present invention provides for better emission control during certain engine operating conditions as explained above. Although a particular injection waveform for delivering multiple fuel injections may vary depending upon the particular engine operating conditions, the present system is capable of determining the timing associated with the anchor delay current signal regardless of the type of electronically controlled fuel injectors being utilized, and regardless of the type of fuel being utilized. In this regard, the appropriate fuel maps can be stored or otherwise programmed into the ECM 56 for use during any steady state condition of the engine. These operational maps, tables and/or mathematical equations stored in the programmable memory of the ECM 56 determine and control the various parameters associated with the appropriate multiple injection events to achieve desired emissions control.

It is recognized that variations to the steps depicted in flowchart 84 (FIGS. 4*a* and 4*b*) could be made without departing from the spirit and scope of the present invention. In particular, steps could be added or some steps could be eliminated. All such variations are intended to be covered by the present invention.

As is evident from the foregoing description, certain aspects of the present invention are not limited by the particular details of the examples illustrated herein and it is therefore contemplated that other modifications and applications, or equivalencies thereof, will occur to those skilled in the art. It is accordingly intended that the claims shall cover all such modifications and applications that do not depart from the spirit and scope of the present inventions.

Other aspects, objects and advantages of the present invention can be obtained from a study of the drawings, the disclosure and the appended claims.

What is claimed is:

1. A fuel injection control system for trimming an engine in a steady state so that a plurality of injectors contained therein operate in a pre-selected mode, the apparatus comprising:

an engine speed sensor;

an engine load sensor;

an electronic control module in electrical communication with the engine speed sensor and the engine load sensor;

wherein the electronic control module is operable, upon determining that the engine speed and load are in a steady state, to select a previously unselected injector; to determine the operating mode of the selected injector; to record the operating mode of the selected injector; to sequentially repeat the operations of selecting a previously unselected injector; to determine the operating mode of the selected injector and record the operating mode of the selected injector for each of the plurality of injectors; to compare the recorded operating mode of each injector to the pre-selected operating mode to determine which of the selected injectors is not operating in the pre-selected operating mode; and to change the detected operating mode to the pre-selected mode for each of the injectors determined to be operating in other than the pre-selected operating mode.

2. The fuel injection control system, as set forth in claim 1, wherein the injector modes of operation include a split mode and boot mode.

3. The fuel injection control system, as set forth in claim 2, wherein the electronic control module determines the pre-selected mode by referring to lookup maps.

4. The fuel injection control system, set forth in claim 3, wherein each injector delivers fuel to a respective cylinder during repeated injection cycles.

5. The fuel injection control system, as set forth in claim 4, wherein an anchor delay current signal occurs for a portion of each injection event.

6. The fuel injection control system, as set forth in claim 5, wherein the electronic control module determines the operating mode of the selected injector by recording a predetermined statistical average difference in the volume of fuel delivered between a boot mode and a split mode; recording a predetermined anchor delay current signal offset; recording a steady state volume of fuel delivered by all of the injectors for an injection event; increasing the anchor delay current signal duration by the predetermined anchor delay current signal offset to cause a new volume of fuel to be delivered by the injectors; recording the new volume of fuel delivered by the injectors; computing a difference between the steady state fuel volume and the new fuel volume; and determining whether the difference between the steady state fuel volume and the new fuel is greater than the predetermined statistical average difference in the volume of fuel delivered between a boot mode and a split mode.

7. The fuel injection control system, as set forth in claim 6, wherein the electronic control module records the operating mode of the selected injector by recording that the selected injector was operating in the boot mode before increasing the duration of the anchor delay current signal duration if the difference between the steady state fuel volume and the new fuel volume is greater than the predetermined statistical average difference in the volume of fuel delivered between a boot mode and a split mode, and by recording that the selected injector was operating in the split mode before increasing the duration of the anchor delay current signal duration if the difference between the steady state fuel volume and the new fuel volume is less than the predetermined statistical average difference in the volume of fuel delivered between a boot mode and a split mode.

8. The fuel injection control system, as set forth in claim 7, wherein the electronic control module changes the detected operating mode of a selected injector to the preselected mode by altering the duration of the anchor delay current signal by the predetermined anchor delay current signal offset.

9. A method for trimming an engine having at least one injector controllable by an electronic control signal, the engine having an engine speed and load, the method comprising:

detecting an operating mode of each injector.

10. The method, as set forth in claim 9, including the step of modifying the electronic control signal to each injector.

11. The method, as set forth in claim 10, including the step of detecting an operating mode of each injector generated by the modified electronic control signal.

12. The method, as set forth in claim 11, wherein the injector modes of operation include a split mode and a boot mode.

13. The method, as set forth in claim 12, wherein the characteristics of the electronic control signal are determined in accordance with lookup maps associated with the engine.

14. The method, as set forth in claim 13, wherein each injector delivers fuel to a respective cylinder during repeated injection events.

15. The method, as set forth in claim 14, wherein the electronic control signal includes an anchor delay current signal for a portion of each injection event.

* * * * *